(12) United States Patent
Drummond

(10) Patent No.: US 6,228,161 B1
(45) Date of Patent: *May 8, 2001

(54) USE OF CALCIUM CARBONATE IN AN ACIDIC AQUEOUS MEDIA

(75) Inventor: Donald Kendall Drummond, Quakertown, PA (US)

(73) Assignee: Minerals Technologies Inc., Bethlehem, PA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/774,662

(22) Filed: Dec. 30, 1996

(51) Int. Cl.$^7$ .................................................... D21H 17/64
(52) U.S. Cl. ........................ 106/464; 106/465; 162/135; 162/181.2
(58) Field of Search .................................... 106/464, 465; 162/135, 181.2, 168.1, 158

(56) References Cited

U.S. PATENT DOCUMENTS

| | | | |
|---|---|---|---|
| 1,879,483 | * 9/1932 | Rafton | 162/181.2 |
| 4,282,059 | * 8/1981 | Davidson | 162/181.2 |
| 5,043,017 | 8/1991 | Passaretti . | |
| 5,505,819 | 4/1996 | DeWitt et al. . | |
| 5,531,821 | 7/1996 | Wu . | |
| 5,593,488 | * 1/1997 | Wu | 106/464 |
| 5,647,902 | * 7/1997 | Wu | 106/464 |

* cited by examiner

Primary Examiner—Peter Chin
(74) Attorney, Agent, or Firm—Terry B. Morris; Marvin J. Powell

(57) ABSTRACT

The present invention relates to an acid-stabilized calcium carbonate slurry having a pH of less than 7, preferably between about 6 and about 7, containing water, calcium carbonate, preferably precipitated calcium carbonate, and an acid-stabilizer of a water soluble calcium salt, a weak acid, a chelating agent, a weak acid capable of chelating calcium ion, or a mixture thereof. The acid-stabilizer is present in an amount sufficient to provide an aqueous calcium carbonate slurry having an increased calcium ion concentration and an acidic pH. In a typical acid-stabilized calcium carbonate slurry of the invention, the acid-stabilizer is present in an amount sufficient to provide a calcium ion concentration of about 1 millimolar to about 5 molar, preferably from about 1 to about 120 millimolar. The invention also relates to a method of making the acid-stabilized calcium carbonate slurry of the invention, to a method of forming a filled paper, that includes the step of adding the acid-stabilized calcium carbonate slurry of the invention to a papermaking pulp in a process for making acid paper, and to a filled paper produced according to the method of the invention.

16 Claims, No Drawings

USE OF CALCIUM CARBONATE IN AN ACIDIC AQUEOUS MEDIA

FIELD OF THE INVENTION

The present invention is directed to an acid-stabilized calcium carbonate slurry having a reduced pH, and a process for producing the slurry. This acid-stabilized calcium carbonate slurry is useful as a filler in neutral or acid paper to improve the optical properties of the paper.

BACKGROUND OF THE INVENTION

Fillers are typically added to paper during the paper making process to improve the optical properties of the paper, such as brightness. In acid papermaking, which is often used for making paper from a groundwood pulp, the pH of the paper stock is generally substantially less than 7, and is normally in the range of from about 4 to about 6. In comparison, in neutral papermaking, the pH is normally maintained in the range of from about 6.8 to about 7.5. Therefore, in acid papermaking and under certain conditions in neutral papermaking, a filler material that is stable and resistant to attack by acid under weakly acidic to acidic conditions is required.

Titanium dioxide and calcined clay have often been used as fillers in neutral and acidic paper. However, these materials, and titanium dioxide in particular, are expensive, thus adding to the cost of the paper.

Both ground natural and precipitated calcium carbonate are used as a filler material for alkaline paper, which is typically produced from a paper stock having a pH of about 8. The resulting paper has enhanced optical properties without the cost of more expensive fillers. However, calcium carbonate normally decomposes in acidic aqueous media, and, thus, generally cannot be used as a filler in acid paper unless the calcium carbonate filler is acid-stabilized, that is, made resistant to decomposition at a pH of less than 7. Because alkaline conditions and alkaline fillers typically have a negative impact on the properties of groundwood paper, a calcium carbonate filler can only be used with a groundwood paper pulp if the calcium carbonate filler is acid-stabilized for use under acidic conditions.

Calcium carbonate filler materials, both precipitated and ground natural, have been treated or modified in the prior art for various reasons. In the case of precipitated calcium carbonate, the treatment or modification has been performed both during and after the precipitation process. Treatments include coating calcium carbonate particles with a non-reactive material, such as a polysaccharide, fatty acid, or gum material, and treating calcium carbonate particles or a slurry of calcium carbonate with various weak acids and bases, salts, and chelating agents.

In particular, U.S. Pat. No. 4,240,870 discloses the addition of at least one phosphoric acid, such as orthophosphoric acid, metaphosphoric acid, tripolyphosphoric acid, pyrophosphoric acid, tetrapolyphosphoric acid, and hexapolyphosphoric acid, or the sodium, potassium, or zinc salt of at least one phosphoric acid to an aqueous calcium hydroxide suspension as the first step of a multi-step process for the production of precipitated calcium carbonate. Similarly, U.S. Pat. No. 4,244,933 discloses the addition of one of the phosphoric acids or salts disclosed in U.S. Pat. No. 4,240,870 as an ingredient in either the first or second step of a multi-step process for the production of precipitated calcium carbonate.

U.S. Pat. No. 4,018,877 discloses the addition of a complex-forming agent, such as a polyphosphate, e.g., sodium hexametaphosphate, during or after the end of the first carbonation step in a multi-step process for the production of precipitated calcium carbonate. Preferably, the agent is added after the bulk of the calcium carbonate precipitation is complete. Alternatively, the complex forming agent is added during a subsequent ageing or carbonation step.

U.S. Pat. No. 4,157,379 disclose the addition of a soluble metal salt, such as an alkali metal phosphate, after the primary carbonation of an aqueous suspension of calcium hydroxide.

Laid-open Japanese Patent Application No. 090821/60 discloses a process for the preparation of calcium carbonate in which a condensed phosphoric acid or salt thereof is added to the viscous gelatinous emulsion formed from the carbonation of an aqueous dispersion of calcium hydroxide. The condensed phosphoric acid may be hexametaphosphoric acid, pyrophosphoric acid, tripolyphosphoric acid, polyphosphoric acid or ultraphosphoric acid. Laid-open Japanese Patent Application No. 090822/60 discloses the same process with the addition of a magnesium-containing compound in the dispersion of calcium carbonate.

However, all of the references cited above disclose processes that require the addition of a phosphoric acid or phosphate salt during a process for the production of precipitated calcium carbonate.

U.S. Pat. No. 4,793,985 discloses the addition of a dispersing agent, such as a water soluble salt of polyphosphoric acid or a phosphate, particularly, sodium hexametaphosphate, to a slurry of ground calcium carbonate to improve the distribution of solids within the liquid, as part of a process for producing an ultrafine calcium carbonate.

U.S. Pat. No. 4,610,801 discloses the use of polyphosphoric or polyphosphates in a slurry of mineral particles, such as calcium carbonate, in waste treatment.

U.S. Pat. No. 4,219,590 discloses the treatment of calcium carbonate, having an average particle diameter of no more than 20 $\mu$m, with an acid gas that is capable of reaction with calcium carbonate.

Japanese Patent No. 030812/82 discloses improving the surface of calcium carbonate particles by adding an aqueous solution of a condensed phosphate, such as a metaphosphate or pyrophosphate to an aqueous calcium carbonate suspension. As a result, the calcium carbonate particles have a resistance to acid, and the pH of the particles is reduced by 0.1 to 5.0.

U.S. Pat. Nos. 5,043,017 and 5,156,719 disclose an acid-stabilized calcium carbonate for use as a filler in neutral to weakly acidic paper. These patents state that the acid-stabilized calcium carbonate is able to resist degradation under mildly acidic conditions due to a buffering action between an absorbed or reacted calcium-chelating agent or conjugate base on the surface of the calcium carbonate and a weak acid in solution in the calcium carbonate slurry.

U.S. Pat. No. 5,505,819 discloses a process for producing neutral paper from wood-containing pulp and a natural calcium carbonate filler. The pH of the stock is maintained in the range of 6.7 to 7.3 by the addition of a pH reducing and buffering agent, preferably phosphoric acid.

U.S. Pat. No. 5,531,821 discloses an acid resistant calcium carbonate filler for use in making neutral to weakly acidic paper, comprising a mixture of calcium carbonate and about 0.5 to 10 percent, based on the dry weight of calcium carbonate, of a cationic salt and an anionic salt.

There still remains a need for improved acid-stabilized calcium carbonate materials and methods for producing such materials for use in acid papermaking. The present invention provides one solution to satisfy this need.

SUMMARY OF THE INVENTION

The present invention relates to an acid-stabilized calcium carbonate slurry having a pH of less than 7, preferably between about 6 and about 7, which may be used as a filler for making a filled acid paper, which slurry comprises water, calcium carbonate, and an acid-stabilizer of one of a water soluble calcium salt, a weak acid, or a chelating agent and certain mixtures thereof. The acid-stabilizer is present in an amount sufficient to provide an aqueous calcium carbonate slurry having an increased calcium ion concentration and an acidic pH. Calcium carbonate is present in the acid-stabilized calcium carbonate slurries of the invention in an amount useable in papermaking processes, typically about 1 to about 40 percent by weight, preferably about 5 to about 30 percent by weight, most preferably about 15 to about 25 percent by weight, and is preferably precipitated calcium carbonate.

In a first embodiment of the invention, the acid-stabilizer is a water soluble calcium salt, and is typically present in an amount sufficient to provide a calcium ion concentration of about 1 millimolar to about 5 molar, preferably from about 1 to about 120 millimolar. Preferred salts include calcium sulfate, calcium acetate, calcium nitrate, calcium citrate, a calcium halide, e.g., calcium chloride, and mixtures thereof.

In a second embodiment of the invention, the acid-stabilizer is a weak acid, and is present in an amount sufficient to provide a weak acid concentration of from about 0.1 to about 1000 millimolar, preferably from about 0.2 to about 100 millimolar. Preferred weak acids include carbonic acid, phosphoric acid, sulfurous acid, or a carboxylic acid, where the carbonic acid is typically provided by the addition of carbon dioxide gas. In addition to the weak acid, the acid-stabilizer may further comprise a water soluble calcium salt in an amount sufficient to provide a calcium ion concentration of about 1 millimolar to about 5 molar, preferably from about 1 to about 120 millimolar.

In an additional embodiment of the invention, the acid-stabilizer comprises a water soluble calcium salt in an amount sufficient to provide a calcium ion concentration of about 1 millimolar to about 5 molar, preferably from about 1 to about 120 millimolar, and a chelating agent in an amount sufficient to provide a chelating agent concentration of from about 0.01 to about 1000 millimolar, preferably from about 0.1 to about 100 millimolar. Preferred chelating agents include polycarboxylates, such as sodium ethylenediamenetetraacetic acid or sodium polyacrylate, and also include polyphosphates, phosphonates, and polyphosphonates. As used herein, a "chelating agent" is an agent which inhibits formation of insoluble calcium compounds from the interaction of the soluble calcium ion and other species present in the system (such as, but not limited to, the weak acid). Such agents may be organic, inorganic or polymeric in nature. Accordingly, in the example of a phosphoric acid system, the chelating agent inhibits the formation of calcium-phosphorous containing deposits (such as, but not limited to, calcium phophates such as hydroxyapatite) or, in the example of a carbonate-weak acid system, inhibits calcium carbonate deposits.

In a further embodiment of the invention, the acid-stabilizer comprises a weak acid capable of chelating calcium ion, present in a concentration of from about 0.001 to about 1000 millimolar, preferably from about 0.01 to about 100 millimolar. Preferred weak acids capable of chelating calcium ion include polycarboxylic acids, polyacrylic acid, sulfonic acid, polyphosphonic acid, or a compound containing a carboxylic acid group such as ethylenediamenetetraacetic acid (EDTA), nitrilotriacetic acid (NTA), diethylenetriamine-pentaacetic acid (DTPA), or a compound containing a phosphonic acid group such as nitrilotri (methylene)triphosphonic acid.

The invention also relates to a method of forming a filled paper, which comprises adding the acid-stabilized calcium carbonate slurry comprising any of the acid-stabilizers described above to a papermaking pulp in a process for making acid paper, and thereafter forming a filled paper by that process. In addition, the invention relates to a method for making an acid-stabilized calcium carbonate slurry by forming a slurry of water, calcium carbonate, and an acid-stabilizer of a water soluble calcium salt, a weak acid, a chelating agent, a weak acid capable of chelating calcium ion, or a mixture thereof. The water soluble calcium salt, weak acid, chelating agent, weak acid capable of chelating calcium ion, or mixture thereof is added in an amount sufficient to provide an aqueous calcium carbonate slurry having an increased calcium ion concentration and an acidic pH of less than 7. In the preferred method, an aqueous slurry of calcium hydroxide is first carbonated to form a precipitated calcium carbonate slurry. The invention also relates to an acid paper, which contains a filler produced in accordance with the invention.

DETAILED DESCRIPTION OF THE INVENTION

The present invention relates to an acid-stabilized calcium carbonate that can be used in neutral and acidic aqueous media with little or no decomposition. In particular, the present invention relates to a calcium carbonate filler material for use in neutral or acid paper. The calcium carbonate may be either precipitated or ground natural, but is preferably precipitated. Unless otherwise stated, all references herein to calcium carbonate indicate that either precipitated or ground natural calcium carbonate may be utilized.

An acid-stabilized calcium carbonate according to the invention for use as a filler material in neutral or acid paper is obtained by treating a calcium carbonate slurry in a manner that increases the concentration of calcium ion, $Ca^{2+}$, to provide a calcium carbonate slurry having an acidic pH, rather than the alkaline pH of an untreated calcium carbonate slurry. It has been now discovered that suppressing the pH of a calcium carbonate slurry by increasing the calcium ion concentration provides a calcium carbonate material that is stable in a neutral or acidic aqueous media, such as that used in a paper making machine or process used for making neutral or acid paper. The acid-stabilized calcium carbonate material is obtained by adding to a calcium carbonate slurry at least one acid-stabilizer of a water soluble calcium salt, a weak acid, or a chelating agent, a mixture of a water soluble calcium salt and a weak acid, or a mixture of a water soluble calcium salt and a chelating agent. Each of the these acid-stabilizers, when added to a calcium carbonate slurry, increase the calcium ion concentration, providing a calcium carbonate slurry having a suppressed, acidic pH.

In one embodiment of the invention, a water soluble calcium salt is added to a calcium carbonate slurry as an acid-stabilizer. The addition of soluble calcium ion lowers the pH of the calcium carbonate slurry by lowering the concentration of soluble carbonate ion, $CO_3^{2-}$. In addition, calcium ions are slightly acidic in aqueous solution. Preferred water soluble calcium salts include calcium halides, in particular, calcium chloride, calcium sulfate, calcium acetate, calcium nitrate, and calcium citrate. However, any water soluble calcium salt that will provide a calcium ion concentration of about 1 millimolar to about 5 molar, preferably from about 1 to about 120 millimolar can be used in the present invention. Alternatively, the salts can be generated in situ by adding an appropriate amount of an acid that will react with calcium carbonate to produce the desired concentration of calcium salt. For example, hydrochloric acid can be added to produce calcium chloride, nitric acid can be added to produce calcium nitrate, or acetic acid can be added to produce calcium acetate.

In a second embodiment of the invention, the pH of the calcium carbonate slurry is suppressed and the calcium ion concentration is increased by the addition of an acid-stabilizer of a weak acid or the combination of a weak acid and a water soluble calcium salt. The weak acid-stabilizes the calcium carbonate slurry by creating a low pH buffered system with the calcium carbonate. The addition of calcium ion to this buffered system further suppresses the pH of the calcium carbonate slurry in the manner described above. A variety of weak acids are useful in the present invention. Preferred weak acids include carbonic acid, formed by the addition of carbon dioxide to an aqueous solution or suspension, phosphoric acid, sulfurous acid, and various carboxylic acids, such as acetic acid. As above, a calcium ion concentration of about 1 millimolar to about 5 molar, preferably from about 1 to about 120 millimolar, is useful in the invention. The concentration of weak acid should be from about 0.1 to about 1000 millimolar, preferably, from about 0.2 to about 100 millimolar.

Acid-stabilized calcium carbonate slurries having an acidic pH can also be obtained by adding a water soluble calcium salt and a calcium ion chelating agent to a calcium carbonate slurry. In combination, the calcium ion and the chelating agent provide lower pH values than can be obtained with calcium ion alone. Preferred chelating agents include polycarboxylates, such as sodium EDTA and sodium polyacrylate. Typically, the chelating agent is added in a concentration of from about 0.01 to about 1000 millimolar, preferably, from about 0.1 to about 100 millimolar. Water soluble calcium salts of the type described above are used in the typical and preferred concentrations listed above.

In a further embodiment, an acid-stabilized calcium carbonate slurry having an acidic pH can be generated by the addition of a weak acid that is capable of chelating calcium. Preferred weak acids that are capable of chelating calcium include polycarboxylic acids, such as EDTA, NTA, DTPA, and polyacrylic acid, sulfonic acids, and polyphosphonic acids, phosphonic acids, or compounds containing phosphonic acid, such as nitrilotri(methylene)triphosphonic acid. The concentration of calcium chelating weak acids useful in the invention typically range from about 0.001 to about 1000 millimolar, preferably from about 0.01 to about 100 millimolar.

In each of the embodiments of the invention, the calcium ion concentration is increased, either by the direct addition of an acid-stabilizer in the form of a water soluble calcium salt, a weak acid, or a chelating agent. The addition of the weak acid typically generates calcium ion by reaction with the calcium carbonate in the slurry. The increase in calcium ion concentration lowers the pH by decreasing the carbonate ion concentration through the common ion effect. Chelating agents maintain the calcium ion concentration, and stabilize the system. In addition, weak acids will typically buffer the system at a stable, suppressed pH. In general, an increase in either the calcium ion concentration or the weak acid concentration lowers the pH of the slurry. A calcium carbonate slurry having a stable, lower pH is then acid-stabilized for use as a filler material in neutral or acidic paper.

Once formed, acid-stabilized calcium carbonate slurries prepared according to the present invention can be added to neutral or acid paper as a filler material during the paper-making process by any method known in the art for forming a filled paper. Accordingly, the present invention includes a method of forming a filled paper comprising adding the acid-stabilized calcium carbonate slurry of the present invention to papermaking pulp in a process for making acid paper and forming a filled paper by said process.

EXAMPLES

The following non-limiting examples are merely illustrative of the preferred embodiments of the present invention, and are not to be construed as limiting the invention, the scope of which is defined by the appended claims.

Example 1

This example demonstrates the effect of the addition of soluble calcium chloride and calcium acetate salts to increase the calcium ion concentration, or the addition of hydrochloric acid and acetic acid to generate the respective salts in situ on the pH of a 5 percent calcium carbonate slurry. Five percent calcium carbonate slurries were prepared having calcium salt concentrations, either calcium chloride or calcium acetate, ranging from 0 to 250 millimolar. In each case, the pH was measured four days after each slurry was prepared. An increase in the calcium salt concentration resulted in a drop in the pH of the slurry. This is typical for the addition of any water soluble calcium salt, or the addition of an acid to the slurry that will generate a water soluble calcium carbonate salt. Despite the acidic pH of the resulting slurries, the slurries were acid-stabilized, maintaining a concentration of calcium carbonate of about 5 percent with little or no decomposition of the carbonate.

Example 2

This example demonstrates the effect of the addition of a weak acid and of a weak acid and calcium ion on the pH of a 5 percent calcium carbonate slurry. A 5 percent calcium carbonate slurry was prepared and placed under carbon dioxide at a pressure of one atmosphere. Under one atmosphere of $CO_2$, the pH of the slurry could be maintained at pH 6 for at least 10 days without the addition of calcium ion and little or no decomposition of the calcium carbonate in the slurry. The addition of calcium ion, added as calcium chloride, further suppressed the pH of the slurry to 5.8 with a calcium ion concentration of 20 millimolar, and to as low as 5.4 with a calcium ion concentration of 200 millimolar. As with the pH 6 slurry, the pH of the slurries acid-stabilized with carbon dioxide and calcium ion was stable for at least 10 days.

Example 3

The effect of a constant concentration of sodium hexametaphosphate chelating agent ("SHMP") with various concentrations of calcium ion on the pH of a 5 percent calcium carbonate slurry after three days. Five percent calcium carbonate slurries having an SHMP concentration of 0.7 millimolar and calcium ion concentrations of 2.4, 12, and 120 millimolar, added in the form of calcium chloride, were prepared. The pH of the calcium carbonate slurry decreases with increasing calcium ion concentration. However, when the chelating agent is present, the pH is lower than with calcium ion alone. The addition of a sufficient amount of calcium ion to form a slurry with a chelating agent concentration of 0.7 millimolar SHMP further lowers the pH to 5.5.

Example 4

This example demonstrates the effect of a compound containing a phosphonic acid group, i.e., nitrilotri (methylene)triphosphonic acid, on the pH of a 5 percent calcium carbonate slurry. Five percent calcium carbonate slurries having acid concentrations of 0.4, 4 and 40 millimolar were prepared. In each case, the phosphonic acid reacted with a small portion of the calcium carbonate in the slurry, increasing the calcium ion concentration, and lowering pH. The solution was further stabilized by the chelation effect of the phosphonate that is formed and the buffering effect of the acid, which further lowers the pH. Systems of this type are highly effective in lowering the pH of the slurry with as little as 40 millimolar acid giving pH values of as low as 5.5.

While it is apparent that the invention disclosed herein is well calculated to fulfill the objects stated above, it will be appreciated that numerous modifications and embodiments may be devised by those skilled in the art. Therefore, it is intended that the appended claims cover all such modifications and embodiments that fall within the true spirit and scope of the present invention.

I claim:

1. An acid-stabilized calcium carbonate slurry for use in making acid paper, consisting of water, calcium carbonate, and a water soluble calcium salt wherein the water soluble calcium salt is present in an amount sufficient to provide an aqueous calcium carbonate slurry having a calcium ion concentrate from about 1 millimolar to about 5 molar sufficient to impart a pH of less than 7.

2. The acid-stabilized calcium carbonate slurry of claim 1, wherein the calcium carbonate is present in an amount of from about 1 to about 40 percent by weight.

3. The acid-stabilized calcium carbonate slurry of claim 1, wherein the calcium carbonate is precipitated calcium carbonate.

4. The acid-stabilized calcium carbonate slurry of claim 1, wherein the water soluble calcium salt is present in an amount sufficient to provide a calcium ion concentration of from about 1 millimolar to about 5 molar.

5. The acid-stabilized calcium carbonate slurry of claim 4, wherein the water soluble calcium salt is present in an amount sufficient to provide a calcium ion concentration of from about 1 to about 120 millimolar.

6. The acid-stabilized calcium carbonate slurry of claim 4, wherein the calcium salt is calcium sulfate, calcium acetate, calcium nitrate, calcium citrate, a calcium halide, or a mixture thereof.

7. The acid-stabilized calcium carbonate slurry of claim 6, wherein the calcium halide is calcium chloride.

8. The acid-stabilized calcium carbonate slurry of claim 1, additionally comprising a weak acid present in an amount sufficient to provide a weak acid concentration of from about 0.1 to about 1000 millimolar.

9. The acid-stabilized calcium carbonate slurry of claim 8, wherein the weak acid is added in an amount sufficient to provide a weak acid concentration of from about 0.2 to about 100 millimolar.

10. The acid-stabilized calcium carbonate slurry of claim 8, wherein the water soluble calcium salt is present in an amount sufficient to provide a calcium ion concentration of from about 1 millimolar to about 5 molar.

11. The acid-stabilized calcium carbonate slurry of claim 10, wherein the water soluble calcium salt is present in an amount sufficient to provide a calcium ion concentration of from about 1 to about 120 millimolar.

12. The acid-stabilized calcium carbonate slurry of claim 8, wherein the weak acid is carbonic acid, phosphoric acid, sulfurous acid, or a carboxylic acid.

13. The acid-stabilized calcium carbonate slurry of claim 1, wherein the water soluble calcium salt is present in an amount sufficient to provide a calcium ion concentration of from about 1 millimolar to about 5 molar and additionally comprising a chelating agent in a concentration of from about 0.01 to about 1000 millimolar.

14. The acid-stabilized calcium carbonate slurry of claim 13, wherein the water soluble calcium salt is present in an amount sufficient to provide a calcium ion concentration of from about 1 to about 120 millimolar and the chelating agent is present in a concentration of from about 0.1 to about 100 millimolar.

15. The acid-stabilized calcium carbonate slurry of claim 13, wherein the chelating agent is a polycarboxylate.

16. The acid-stabilized calcium carbonate slurry of claim 15, wherein the polycarboxylate is sodium ethylenediaminetetraacetic acid (EDTA) or sodium polyacrylate.

* * * * *